(12) United States Patent
Dalgewicz, III

(10) Patent No.: US 6,773,735 B1
(45) Date of Patent: Aug. 10, 2004

(54) MULTI-LAYERED THERMOPLASTIC CONTAINER

(75) Inventor: Edward J. Dalgewicz, III, Fletcher, NC (US)

(73) Assignee: Associated Packaging Enterprises, Inc., Waynesville, NC (US)

( * ) Notice: Subject to any disclaimer, the term of this patent is extended or adjusted under 35 U.S.C. 154(b) by 0 days.

(21) Appl. No.: 09/722,591

(22) Filed: Nov. 28, 2000

(51) Int. Cl.$^7$ .................. B65D 81/34; B32B 27/08; B32B 27/32; B32B 27/36

(52) U.S. Cl. .................. 426/127; 426/107; 428/35.7; 428/483; 428/516; 428/520

(58) Field of Search ................. 426/127, 234, 426/243, 106, 107, 113; 428/35.7, 35.9, 483, 516, 520, 35.8, 35.91

(56) References Cited

U.S. PATENT DOCUMENTS

| | | | |
|---|---|---|---|
| 3,960,631 A | * 6/1976 | Weiss et al. | 156/244 |
| 3,960,807 A | 6/1976 | McTaggart | 260/400 |
| 4,656,094 A | 4/1987 | Kojima et al. | 428/412 |
| 4,737,548 A | 4/1988 | Kojima et al. | 525/193 |
| 4,753,980 A | 6/1988 | Deyrup | 524/369 |
| 4,946,918 A | 8/1990 | Akiyama et al. | 526/271 |
| 4,981,631 A | 1/1991 | Cheung et al. | 264/50 |
| 4,983,660 A | 1/1991 | Yoshida et al. | 524/367 |
| 5,109,060 A | 4/1992 | Fischer | 524/600 |
| 5,211,662 A | 5/1993 | Barrett et al. | 623/6 |
| 5,219,665 A | * 6/1993 | Chen et al. | 428/515 |
| 5,409,967 A | 4/1995 | Carson et al. | 523/201 |
| 5,418,108 A | 5/1995 | Kmiecik-Lawrynowicz et al. | 430/137 |
| 5,424,347 A | * 6/1995 | Blemberg et al. | 524/109 |
| 5,436,296 A | * 7/1995 | Swamikannu et al. | 525/166 |
| 5,562,997 A | 10/1996 | Krejci et al. | 428/480 |
| 5,637,410 A | 6/1997 | Bonner et al. | |
| 5,695,839 A | * 12/1997 | Yamada et al. | 428/35.7 |
| 5,723,520 A | 3/1998 | Akkapeddi et al. | 523/455 |
| 5,849,401 A | * 12/1998 | El-Afandi et al. | 428/215 |
| 5,849,846 A | 12/1998 | Chen et al. | 525/156 |
| 5,916,615 A | * 6/1999 | Brady et al. | 426/129 |
| 6,020,414 A | 2/2000 | Nelsen et al. | 524/424 |
| 6,020,432 A | 2/2000 | Imes et al. | |
| 6,077,904 A | 6/2000 | Dalgewicz, III et al. | 525/64 |
| 6,099,685 A | 8/2000 | Ito et al. | 156/370 |
| 6,183,863 B1 | * 2/2001 | Kawachi et al. | 428/355 AC |
| 6,254,944 B1 | 7/2001 | Robert et al. | |
| 6,333,094 B1 | * 12/2001 | Schneider et al. | 428/201 |
| 6,355,336 B1 | * 3/2002 | Wakabayashi et al. | 428/215 |
| 6,503,549 B1 | 1/2003 | Mueller | |
| 6,511,724 B1 | * 1/2003 | Siour et al. | 428/36.91 |
| 6,517,918 B1 | * 2/2003 | Rohde et al. | 428/35.7 |

FOREIGN PATENT DOCUMENTS

| | | |
|---|---|---|
| EP | 0 666 285 A1 | 8/1995 |
| EP | 0 747 070 | 12/1996 |
| EP | 0 838 501 A2 | 4/1998 |
| EP | 0 911 148 A2 | 4/1999 |
| WO | WO 91/19767 | 12/1991 |
| WO | WO 93 15146 | 8/1993 |
| WO | WO 01/40377 A1 | 6/2001 |

OTHER PUBLICATIONS

Rosato et al., Concise Encyclopedia of Plastics, 2000, Kluwer Academic Publishers, pp. 292, 391, 392.*

D. Tsiourvas E. Tsartolia, and A. Stassinopoulos, et al. Advances in Polymer Technology, "A New Approach to Recalimed PET Utilization—Blends of Recycled PET Suitable for Extrusion Blow–Molding Technology," vol. 14, No.3, 227–236, 1995.

Y. Pietrasanta et al., Macromol. Chem. Phys., "Reactive compatibilization of HDPE/PET blends by glycidyl methacrylate functionalized polyolefins," 200, No. 1, 142–148, 1999.

Nikos K. Kalfoglou, Dimitrios S. Skafidas and Joannis K. Kallitsis et al., "Comparison of compatibilizer effectiveness for PET/HDPE blends," Butterworth Heinemann, Polymer vol. 36 No. 23, pp. 4453–4462, 1995.

Gravalos, In situ compatibilization of poly(ethylene terephthalate)/poly(ethylene–co–ethyl acrylate) blends; Polymer, 1995, pp. 1393–1399, vol. 36 No. 7.

* cited by examiner

*Primary Examiner*—Milton I. Cano
*Assistant Examiner*—Robert Madsen
(74) *Attorney, Agent, or Firm*—Banner & Witcoff, Ltd.

(57) ABSTRACT

A thermoplastic container, which is particularly useful for packaging meat, comprises a first polymeric layer, a second intermediate or tie layer, and a third polymeric layer. The first layer comprises an alkylene terephthalate or naphthalate polymer such as polyethylene terephthalate (PET). The first layer can include, in whole or in part, one or more homopolymers, co-polymers, recycled polymers, or reprocessed polymers. The third layer comprises a non-polar thermoplastic such as high density polyethylene (HDPE), low density polyethylene (LDPE), linear low density polyethylene (LLDPE), or a blend thereof. The intermediate layer primarily functions as an adhesive and as a compatibilizer/emulsifier/surfactant (CES), and comprises a grafted or backbone-based co-polymer or ter-polymer of ethylene, glycidyl acrylate or maleic anhydride, and optionally an acrylate co-monomer.

10 Claims, 2 Drawing Sheets

MULTI-LAYERED THERMOPLASTIC CONTAINER

FIELD OF THE INVENTION

The present invention is directed to thermoplastic containers and, more particularly, to a thermoplastic container specifically adapted for packaging meat and other foodstuffs.

BACKGROUND OF THE INVENTION

Cellular or foam trays currently are widely used for packaging fresh meat and other foodstuffs. Typically, meat is placed in the tray and overwrapped with a highly elastic, amorphous polymeric film. Even under refrigeration, this type of packaging provides only a limited shelf life for the foodstuffs, typically no more than about seven days. As unsold products approach the end of their shelf life, grocers often need to discount the sale price, and in many cases discard products whose shelf life has expired. The stretched lid stock also exerts stresses on the walls of the cellular or foam tray, which can result in deformation of the tray and/or delamination of the lid stock.

Another problem with currently available trays is consumer misuse. The cellular or foam trays generally are not designed for cooking and generally are not high temperature resistant. One common instance of consumer misuse involves defrosting or thawing frozen meat, while in the tray, in a microwave oven. Because the tray is not designed or intended for cooking, potentially toxic components of the tray can be liberated into the food when the tray containing the foodstuff is exposed to heat or microwave radiation.

It would be desirable to develop a container for packaging meat and other foodstuffs that provides increased shelf life. It also would be desirable to develop a tray for packaging meat that is microwave-safe. It would be particularly desirable to develop such a container that can be manufactured in a cost effective process.

SUMMARY OF THE INVENTION

The present invention is directed to a multi-layered thermoplastic container having a first polymeric layer, a second intermediate layer, and a third polymeric layer. The container is particularly useful for packaging foodstuffs (e.g., fresh meat, fish, or vegetables, prepared or semi-prepared foods, and the like) using gas flushed sealing or modified atmosphere packaging (MAP) with highly elastic films. The polyalkylene terephthalate or naphthalate first layer provides stiffness and dimensional stability to the container, thereby avoiding deformation due to stresses, for example from the stretched lid stock. The first layer also provides excellent gas barrier properties to the container. The third polymeric layer provides markedly improved adhesion with conventional polyethylene-based lid stock. The container, as a whole, exhibits significantly improved gas barrier properties and shelf life for packaged foodstuffs.

The first polymeric layer comprises an alkylene terephthalate or naphthalate polyester, such as PET, and optionally contains recycled or reprocessed polymers.

The second intermediate or tie layer functions primarily as an adhesive and as a compatibilizer/emulsifier/surfactant (CES), and comprises a grafted or backbone co-polymer or ter-polymer of ethylene and a glycidyl acrylate, maleic anhydride, or mixture thereof, and optionally an acrylate co-monomer selected from the group consisting of methacrylate, ethylacrylate, propylacrylate, butylacrylate, ethylhexylacrylate, and mixtures thereof. The second layer optionally comprises a blend of the CES and a polar copolymer of ethylene and a $C_1$–$C_{12}$ acrylate, such as methacrylate, ethylacrylate, propylacrylate, butylacrylate, ethylhexylacrylate, or a mixture thereof. Alternatively, the second layer comprises a suitable adhesive material, for example an anhydride modified polyolefin such as Bynel (duPont); and a minor amount of the CES, usually from about 1 to about 5 wt %, is blended with the polyester first layer.

The third polymeric layer comprises high density polyethylene (HDPE), low density polyethylene (LDPE), linear low density polyethylene (LLDPE), or a blend thereof. Any or all of the polyethylene materials in the third layer can be metallocene-based polyethylene. Metallocene-based polyethylene materials generally have lower melting points and are more amorphous, which improves heat-sealing properties. The third layer usually forms the inner surface of the container, and preferably exhibits good sealing properties with lidding materials.

The container of the present invention can contain additional layers, including a multiplicity of any or all of the aforementioned layers, in any order, as well as one or more additional layers for a wide variety of purposes, including but not limited to aesthetics, color, gloss, physical or chemical compatibility with other layers, and barrier properties. There is no upper limit contemplated on the number of layers that can be present.

The multi-layered container of the present invention provides dramatically improved barrier properties, yielding increased shelf life for food products such as fresh meat, fish, and vegetables. The shelf life of foodstuffs packaged in the container can be as much as 30 days or more, as compared to about 7 days with current trays. The container of the present invention is microwave-safe, i.e., will not contaminate the food upon exposure to heat or microwave radiation. In an alternative embodiment of the invention, the container, though microwave-safe, visibly distorts upon exposure to heat, for example the heat produced by food inside the container being exposed to microwave radiation, so as to provide a dramatic indicator of consumer misuse in applications where the container is not intended for cooking.

Alternatively, the materials of the container can be thermally treated to permit the container to have suitable high temperature resistance to permit use of the container in various cooking applications, such as thawing frozen foods in a microwave oven.

BRIEF DESCRIPTION OF THE DRAWINGS

The present invention will now be described in more detail with reference to preferred embodiments of the invention, given only by way of example, and illustrated in the accompanying drawings in which.

DETAILED DESCRIPTION OF THE INVENTION

Figure 1:
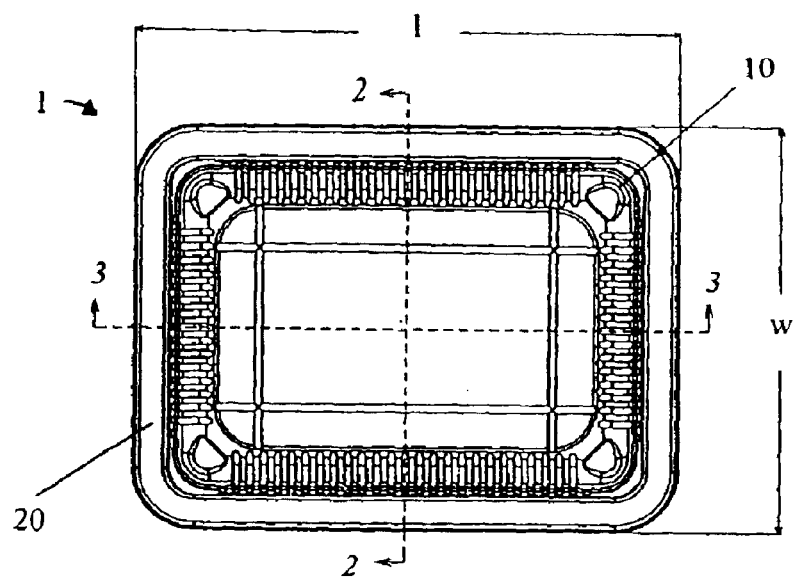
FIG. 1 is a top elevation view of a thermoplastic container in accordance with a preferred embodiment of the invention.

The multi-layered container of the present invention comprises a first polymeric layer, and second intermediate or tie layer, and a third polymeric layer. The first layer, which usually forms the outside of the container, comprises an alkylene terephthalate or naphthalate polyester, such as polyethylene terephthalate (PET). The first layer may include, in whole or in part, virgin polymers, reprocessed or recycled polymers, post-consumer waste, and combinations thereof, any of which can be homo-polymers or co-polymers. As used herein, "reprocessed" and "recycled" each refer to materials that are unused in a given process cycle, typically the "trim" portions of the web around the article-forming portions. The reprocessed materials typically are collected, re-ground, and then mixed with virgin materials.

In many applications, it is desirable to use reprocessed materials not only for cost savings, but also to provide more favorable kinetics to selectively control the level of thermally induced crystallinity. A blend containing reprocessed materials typically exhibits a lower melting point and better thermoforming properties compared to a virgin polymer. For example, virgin and reprocessed polyesters, such as PET, can be combined at a ratio of virgin polyester to reprocessed polyester of from about 1:4 to about 4:1 by weight, more typically from about 1:2 to about 2:1. In one preferred embodiment, virgin PET and reprocessed PET are combined at a weight ratio of about 1:1.

The polyesters can be homopolymers, co-polymers, or blends thereof, and may be straight-chained, branched, or mixtures thereof. In addition, blends of polymers having varying molecular weights and/or intrinsic viscosity (I.V.) may be used. When PET is used, I.V. most often ranges from about 0.5 to 1.2. The polymers may be branched by inclusion of small quantities of trihydric or tetrahydric alcohols, or tribasic or tetrabasic carboxylic acids, examples of which include trimellitic acid, trimethylol-ethane, trimethylolpropane, trimesic acid, pentaerythritol and mixtures thereof. The degree of branching preferably is no more than about 3%. It has been found that blends of homopolymers and copolymers often are particularly desirable to provide overall kinetics more favorable for controlling thermally induced crystallinity.

As used herein alone or as part of another group, the term "alkyl" or "alk" denotes straight and branched chain saturated hydrocarbon groups, preferably having 1 to 20 carbon atoms, more usually 1 to 6 carbon atoms. Exemplary groups include methyl, ethyl, propyl, isopropyl, n-butyl, t-butyl, isobutyl, pentyl, hexyl, isohexyl, heptyl, 4,4-dimethylpentyl, octyl, 2,2,4-trimethylpentyl, nonyl, decyl, undecyl, dodecyl, combinations thereof and the like.

The term "cycloalkyl" as used herein alone or as part of another group, denotes saturated cyclic hydrocarbon ring systems, preferably containing 1 to 3 rings and 3 to 7 carbons per ring. Exemplary groups include cyclopropyl, cyclobutyl, cyclopentyl, cyclohexyl, cycloheptyl, cyclooctyl, cyclodecyl, cyclododecyl, adamantyl and combinations thereof.

The term "alkylene" as used herein denotes divalent, unsaturated hydrocarbon groups of the overall formula —$C_nH_{2n}$—, wherein n preferably is from 1 to 10. Exemplary groups include methylene, ethylene, and propylene. Such groups represent alkyl groups as defined above from which another hydrogen has been removed.

Intrinsic viscosity (I.V.) as used herein is defined as the limit of the fraction ln (v)/C as C, the concentration of the polymer solution, approaches 0, wherein v is the relative viscosity which is measured at several different concentrations in a 60/40 mixed solvent of phenol and tetrachloroethane at 30° C. Units for I.V. are dl/g unless otherwise indicated.

The first layer can include, in whole or in part, an alkylene terephthalate or naphthalate polyester. Polyalkylene terephthalates can be prepared by the polycondensation reaction of terephthalic acid, or a lower alkyl ester thereof, and aliphatic or cycloaliphatic $C_2$–$C_{10}$ diols. Such reaction products include polyalkylene terephthalate resins, including, but not limited to, polyethylene terephthalate, polybutylene terephthalate, polytetramethylene terephthalate, and copolymers and mixtures thereof. As is known to those skilled in the art, these polyester resins may be obtained through the polycondensation reaction of terephthalic acid, or a lower alkyl ester thereof, and an alkylene diol. For example, polyethylene terephthalate can be prepared by polycondensation of dimethyl terephthalate and ethylene glycol following an ester interchange reaction. Nonlimiting examples of suitable polyesters include polyethylene terephthalate (PET), polybutylene terephthatate (PBT), polyethylene naphthalate (PEN), polycycloterephthalate (PCT), polycycloterephthatlic acid (PCTA), (poly)ethylene-co-1,4-cyclohexanedimethylene terephthalate (PETG), polytrimethylene terephthalate (PTT), and co-polymers and mixtures thereof.

The polyester may contain up to about 25 mol % of other aliphatic dicarboxylic acid groups having from about 4 to about 12 carbon atoms as well as aromatic or cycloaliphatic dicarboxylic acid groups having from about 8 to about 14 carbon atoms. Non-limiting examples of these monomers include iso-phthalic acid (IPA), phthalic acid, succinic acid, adipic acid, sebacic acid, azelaic acid, cyclohexane diacetic acid, naphthalene-2,6-dicarboxylic acid, 4,4-diphenylene-dicarboxylic acid and mixtures thereof.

The polyester also may contain up to about 25 mol % of other aliphatic $C_2$–$C_{10}$ or cycloaliphatic $C_6$–$C_{21}$ diol components. Non-limiting examples include neopentyl glycol, pentane-1,5-diol, cyclohexane-1,6-diol, cyclohexane-1,4-dimethanol, 3-methyl pentane-2,4-diol, 2-methyl pentane-2,4-diol, propane-1,3-diol, 2-ethyl propane-1,2-diol, 2,2,4-trimethyl pentane-1,3-diol, 2,2,4-trimethyl pentane-1,6-diol, 2,2-dimethyl propane-1,3-diol, 2-ethyl hexane-1,3-diol, hexane-2,5-diol, 1,4-di(β-hydroxy-ethoxy)benzene, 2,2-bis-(4-hydroxypropoxy-phenyl) propane, and mixtures thereof Linear alkylene terephthalate or naphthalate homopolymers typically exhibit faster crystallization than do co-polymers. Branched polymers typically yield higher melt strengths. As will be appreciated by those skilled in the art, mixtures of branched- or unbranched homopolyrners and/or co-polymers, optionally having varying molecular weights and/or I.V., can be selected to obtain a polymer having the most suitable properties for a particular application. For example, in applications not requiring high temperature resistance, ccpolymers are desirable for such attributes as low melting point and good barrier properties.

Polyesters having lower I.V. generally have lower molecular weights, shorter chain lengths, and exhibit faster crystallization kinetics, resulting in better heat setting properties (e.g., higher dimensional stability). In addition, lower-I.V. polymers generally are less expensive, and have lower extrusion melt temperatures, resulting in less degradation, faster stress relaxation time, reduced molding time and reduced production time. Given these properties, lower I.V. polyesters often can be drawn into deeper molds even without the use of a plug assist. A preferred polyester is polyethylene terephthalate (PET) having an I.V. of less than 0.95, 0.90, 0.85, or 0.80 (available from Shell Polyester). The thickness of the first layer should be suitably selected to provide the desired level of dimensional stability and adequate barrier properties to the container. Most often, the average thickness ranges from about 5 to 35 mils, more usually from about 10 to about 20 mils, and even more usually from about 12 to about 18 mils.

The polyester may contain various impurities. Preferably, impurities that hinder crystallization are held to a minimum. Examples of such impurities include acetylaldehyde, diethylene glycol, and isopropyl aldehyde, with preferred maximum concentrations of these components being 2 wt %, 2 ppm, and 5 wt %, respectively, based on the total weight of the bulk polymer. Skilled practitioners can easily identify the impurities that hinder crystallization and the concentration at which they do so. Other additives known in the art may be included in the composition up to about 30% by weight. Non-limiting examples of such additives include antioxidants, flame retardants, reinforcing agents such as glass fiber, asbestos fiber and flake, mineral fillers, stabilizers, nucleating agents, ultraviolet light stabilizers, heat and light stabilizers, lubricants, dyes, pigments, toners, mold release agents, fillers, such as glass beads and talc, and the like. Minor amounts of one or more additional polymers (e.g., up to about 10 percent by weight) optionally can be incorporated, such as polyamides, polycarbonates, polyethylenes, and polypropylenes. Antioxidants, thermal stabilizers, fillers, pigments and flame retardant additives, when used, preferably do not exert any adverse effect on impact strength.

The intermediate or tie layer primarily functions as an adhesive and as a compatibilizer/emulsifier/surfactant (CES) for the first and third layers, which in a preferred embodiment are polar and non-polar, respectively. A preferred material for the intermediate or tie layer is a grafted or backbone-based co-polymer or ter-polymer comprising ethylene and a glycidyl acrylate, such as glycidyl methacrylate, and/or maleic anhydride. The co-polymer or ter-polymer optionally includes one or more other acrylate co-monomers such as methacrylate, ethylacrylate, propylacrylate, butylacrylate, ethylhexylacrylate, etc. Suitable exemplary amounts of glycidyl acrylate, maleic anhydride, or mixture thereof, range from about 0.05 wt % to about 12 wt %, typically from about 0.5 wt % to about 10 wt %, and more typically from about 0.8 wt % to about 9 wt %, based on the total weight of the co-polymer or ter-polymer. A grafted copolymer or ter-polymer typically will have less glycidyl acrylate or maleic anhydride (e.g., from about 0.2 wt % to about 1.5 wt %), whereas a backbone-based co-polymer or ter-polymer can have higher amounts of glycidyl acrylate and/or maleic anhydride, e.g., as indicated above. Suitable exemplary amounts of acrylate range from 0 to about 40 wt %, preferably from about 10 wt % to about 30 wt %, and even more preferably from about 20 wt % to about 35 wt %, based on the total weight of the co-polymer or ter-polymer. The melt flow index of the co-polymer or ter-polymer preferably is less than about 20, more preferably is less than about 15, and even more preferably is less than about 10 g/10 min.

In one preferred embodiment, the intermediate or tie layer comprises a ter-polymer of ethylene with about 8 wt % glycidyl methacrylate and about 25 wt % methacrylate or butylacrylate, based on the total weight of the ter-polymer. In another preferred embodiment, the intermediate or tie layer comprises a co-polymer of ethylene with about 6 wt % glycidyl methacrylate, based on the total weight of the co-polymer. In another preferred embodiment, the intermediate or tie layer comprises a ter-polymer of ethylene with about 2 wt % glycidyl methacrylate and from about 17 to 25 wt % methacrylate, based on the total weight of the ter-polymer. In yet another preferred embodiment, the intermediate or tie layer comprises a ter-polymer of ethylene with about 3 wt % maleic anhydride and about 17 wt % butylacrylate, based on the total weight of the ter-polymer. Where the first layer includes both reprocessed and virgin polyesters, it may be advantageous to use a blend of the CES polymer families (e.g., glycidyl methacrylate- and maleic anhydride-based) to alter the mode of failure so as to improve adhesion. Under failure conditions, the tie layer generally will delaminate from the polyethylene layer when using the glycidyl methacrylate-based CES, and from the polyester layer when using the maleic anhydride-based CES.

The second layer optionally comprises a blend of the CES co-polymer or ter-polymer, as described above, and a polar co-polymer of ethylene and a $C_1$–$C_{12}$ acrylate, such as methacrylate, ethylacrylate, propylacrylate, butylacrylate, ethylhexylacrylate, or a mixture thereof. The polar co-polymer can be added, for example, to adjust rheology and/or to improve adhesion, thermal stability, compatibility, and the like. The amount of polar co-polymer used will depend on such factors as the co-monomer concentration in the CES. It has been found that improved adhesion and compatibility actually can result when a polar co-polymer is blended with a high co-monomer CES (e.g., 12 wt % of glycidyl methacrylate) at a weight ratio up to about 4:1 (polar co-polymer to CES).

The second layer typically has an average thickness of at least about 0.1 mils. There is no particular upper limit on the thickness; the practical limiting factor is cost. Most often, the average thickness ranges from about 0.1 to about 2 mils, and more usually from about 0.2 to about 1.5 mils.

The third layer comprises non-polar polyethylene. A preferred material for the third layer is high density polyethylene (HDPE) sold under the trade name Chevron 9608, which has a melt flow index of 8 and a density of 0.962. Alternatively, the third layer can comprise low density polyethylene (LDPE), linear low density polyethylene (LLDPE), or any combination of HDPE, LDPE, and LLDPE. Because LDPE generally exhibits poorer barrier properties than HDPE, it is preferred that no more than about 50 wt % LDPE is used, so as to avoid the need for an excessively thick layer. An example of a highly branched LDPE that can be used is Chevron grade 4517, which has a density of 0.923 and a melt flow index of 5. Highly branched polymers typically exhibit improved seal strength over time, but suffer from poorer functional barrier properties. One preferred linear low density polyethylene is Linear Low Density Chevron 7325, which has a density of 0.925 and a melt flow index of 3.5. A blend of HDPE and LLDPE materials often exhibits improved compatibility with reprocessed polyesters and improved heat-setting properties. An example of a blend exhibiting improved hot tack sealing has a major portion of HDPE and from about 10–20 wt % LLDPE.

Any or all of the polyethylene materials in the third layer can include, in whole or in part, metallocene-based polyethylene. Metallocene-based polyethylene materials generally have lower melting points and are more amorphous, which improves heat-sealing properties.

The third layer typically will form the inside of a container and may be selected to provide aesthetics, color, gas barrier properties, and the like. The third layer preferably is selected to improve sealing (adhesion) properties with lidding materials to be later applied onto the container. Commonly used lid stocks include Cryovac 1050, Freshwrap and similar types sold by Cryovac and Packaging Partners. The average thickness of the third layer in the final article most often is greater than about 1 mil, typically ranges from about 1 to about 5 mils, more typically from about 2 to about 4 mils, and even more typically from about 3 to about 4 mils.

Foodstuffs can be packaged in the container using gas flushed sealing or modified atmosphere packaging (MAP). In a typical operation, oxygen ($O_2$), nitrogen ($N_2$), and optionally carbon dioxide ($CO_2$) are controllably flushed into a container containing a foodstuff as the highly elastic lid stock is stretched and sealed to the flange portion of the container. One of the reasons for using highly elastic materials is to avoid sagging of the lid stock due to pressure changes inside the container over time, e.g., as the foodstuff absorbs carbon dioxide.

An example of a three-layered thermoplastic container comprises a first layer comprising a polyethylene terephthalate co-polymer; a second layer comprising a grafted ter-polymer of ethylene and 30 wt % methacrylate and 0.8–1.5 wt % glycidyl methacrylate or maleic anhydride, based on the total weight of the ter-polymer; and a third layer comprising a blend of HDPE and 10–20% LLDPE or Bynel E361 or 3060.

In an alternative embodiment of the present invention, the intermediate or tie layer comprises any suitable adhesive useful in adhering adjacent layers of co-extruded films. In this embodiment, a minor amount of the CES is physically blended with the polyester together with recycled or reprocessed polymers in the first layer, typically in an amount of from about 1 to about 5 wt %. Examples of materials that can be used for the intermediate or tie layer in this embodiment include chemically modified ethylene polymers, e.g., co-polymers of ethylene with esters of ethylenically unsaturated carboxylic acids, such as alkyl acrylates or methacrylates, graft co-polymers of maleic acid or anhydride onto ethylene vinyl acetate copolymers, graft co-polymers of fused ring carboxylic anhydrides onto polyethylene, resin mixtures of these, and mixtures with polyethylene or co-polymers of ethylene and alpha olefin. Such materials include adhesives sold under the tradename Bynel (duPont) or Admer (Mitsui).

Figure 2:
FIG. 2 is a cross-sectional view taken through line 2—2 of FIG. 1.
Figure 3:
FIG. 3 is a cross-sectional view taken through line 3—3 of FIG. 1.

FIG. 1 illustrates an example of a multi-layered container 1 in accordance with a preferred embodiment of the invention. The container can have any suitable length "l" and width "w," which generally are selected in accordance with the intended use of the container and consumer preferences. Often the containers have dimples, deresting lags, or indentations 10 that permit easy stacking and unstacking of the containers. The particular shape and dimensions of the container form no part of the present invention. FIGS. 2 and 3 are cross-sectional views of FIG. 1 taken through lines 2—2 and 3—3, respectively. FIGS. 2 and 3 illustrate the flange area 20 of the container that permits easy stacking and unstacking. The flange area 20 also provides a surface for adhering a lid.

Figure 4:
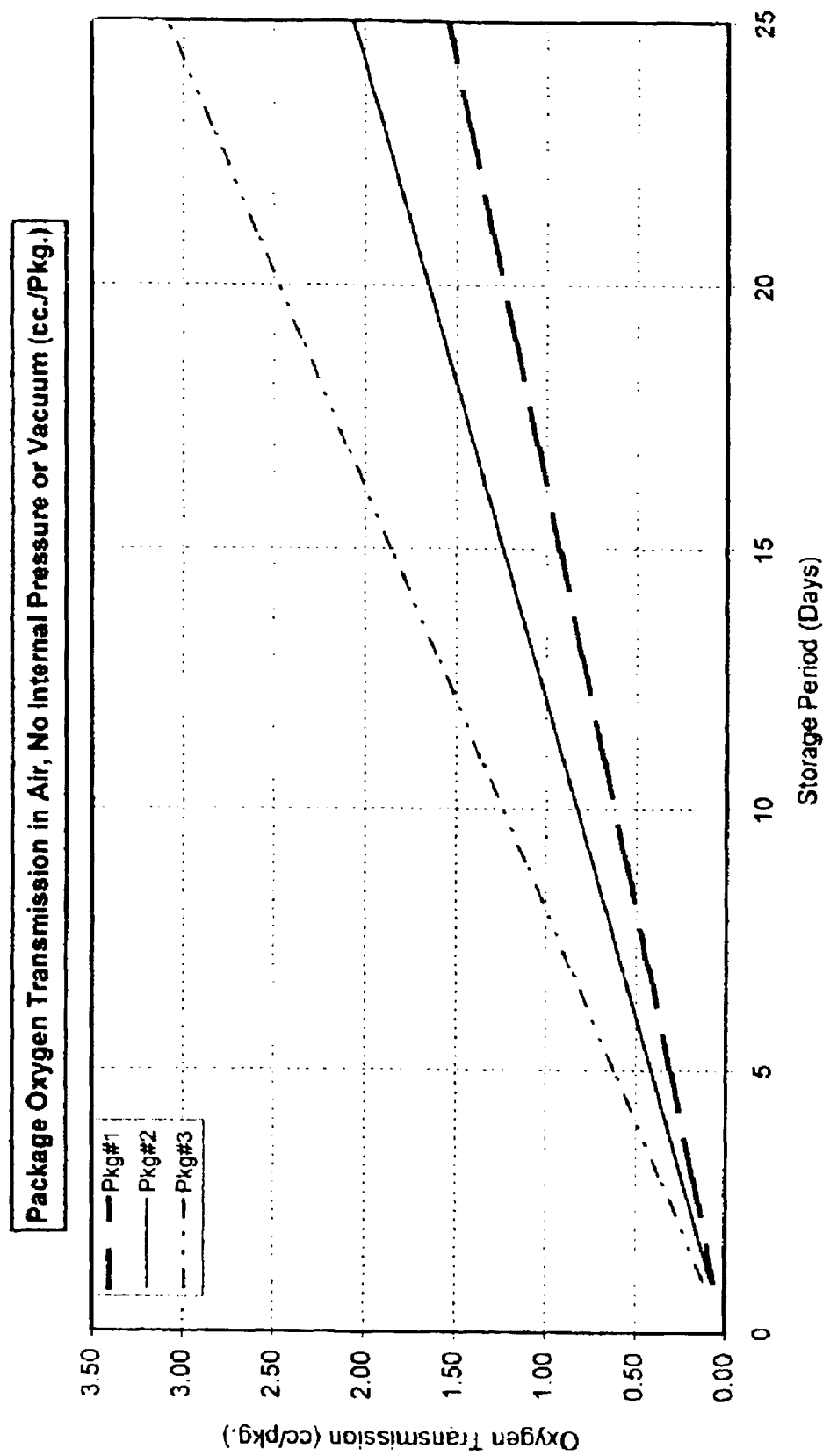
FIG. 4 is a graphical illustration of oxygen transmission rates for containers of the present invention.

FIG. 4 illustrates an example of improved gas barrier properties for containers of the present invention. The three containers tested each had a surface area of 98 in$^2$, a depth of 37 mm, and a trim area of 58 in$^2$. In each container, reprocessed polymers were used in the first layer, which had a final composition of about 80–85 wt % HPPE, 3 wt % CES (glycidyl methacrylate-based), and the balance PET. In "Pkg. #1," the average thickness of the first (PET) layer was about 20 mils; in "Pkg. 2," 15 mils, and in "Pkg. 3," 10 mils. For each container, the average thickness of the intermediate (tie) layer was about 1 mil, and the average thickness of the third layer was about 3 mils, which had a composition of about 80 wt % HDPE and 20 wt % LLDPE. The containers were stored at 4° C. and 95% R.H., and oxygen transmission (in air atmosphere, no internal pressure or vacuum) was measured.

The multi-layered container of the present invention can be made using any suitable process such as a continuous process, a discontinuous process, or a semi-continuous process. Generally, it is preferred to use a continuous process, which typically yields faster production rates and is more cost effective. A discontinuous process may be useful, for example, in the manufacture of containers having a greater area stretch ratio (e.g., deep drawn parts), which often requires the use of a plug assist. A discontinuous process, which typically has lower tooling expenses, also may be more cost effective for making smaller quantities of a particular container. For the continuous process, the area stretch ratio most often ranges from about 1.25:1 to about 3:1, more usually from about 1.5:1 to about 3:1. In one preferred embodiment, the area stretch ratio is about 2:1.

The thermoplastic materials, and in particular the alkylene terephthalate or naphthalate polymer, can subjected to thermal treatments in accordance with the intended use of the container. Preferably, the materials are heat set to provide dimensional stability, impact resistance, temperature resistance, and resistance to microwave radiation. Heat setting is a term describing the process of thermally inducing crystallization of a polyester article in a restrained position. In the practice of the invention, heat setting can be achieved by maintaining intimate contact of the thermoplastic sheet with the heated mold surface for a sufficient time to achieve a level of crystallinity that gives adequate physical properties to the finished part. A level of crystallinity above 15% is preferable for adequate dimensional stability during demolding operations. A level above about 20% is preferable to yield parts with excellent dimensional stability and impact resistance.

The crystallinity of the polymer normally is measured by Differential Scanning Calorimetry (DSC). The terms crystallization temperature and crystallization onset are used interchangeably to mean the temperature or temperature range in which a regularly repeating morphology, brought about by a combination of molecular mobility and secondary bonding forces, is induced in a polymer over a molecular distance of at least several hundred angstroms. In PET, for example, the crystallization temperature or crystallization onset can be visually observed as the point at which a substantially amorphous, non-oriented sheet of polymer changes from a translucent, hazy appearance to a white appearance.

The term glass transition temperature ($T_g$) is used herein to refer to that temperature or temperature range at which a change in slope appears in the volume versus temperature curve for a polymer, and to define a temperature region below which the polymer exhibits a glassy characteristic and above which the polymer exhibits a rubbery characteristic. The glass transition temperature of polyethylene terephthalate is about 70 to 80° C.

The temperature of the mold surface should be selected in accordance with the properties of the thermoplastic materials and the desired level of crystallinity in the article. The temperature of the mold surface should be above the softening point and stretching point of the polymeric materials. Such temperatures promote stress relaxation in the thermoplastic material, which in turn eliminates or substantially eliminates post-mold distortion.

In an alternative embodiment of the invention, the thermoplastic material is subjected to a thermal treatment that is specifically designed to cause the container to become visibly distorted when the container contains foodstuffs and is exposed to microwave radiation. This can be done, for example, by molding the polyester at a lower temperature and/or by maintaining the polyester at the molding temperature for a shorter time so as to achieve no more than minimal heat setting. The distortion, for example, can alert consumers that the container is not intended for use in a microwave oven. Notwithstanding the distortion, the container remains microwave-safe, ie., does not contaminate the food upon exposure to microwave radiation.

Alternatively, the containers can be heat set, as described, so as to provide containers specifically designed for cooking applications such as thawing frozen foods in a microwave oven, e.g., without distortion. The thermoplastic materials can be subjected to thermal treatments to render the container heat resistant and suitable for various other cooking applications, as desired.

A preferred continuous apparatus for preparing the containers is described in co-pending application Ser. No. 09/535,953, the disclosure of which is incorporated by reference. Given the dissimilarities in the properties of the layers (e.g., melting point), three extruders typically are used for processing the first, second, and third layers, respectively. It is preferred that the co-extrudate not be stretched or oriented in either direction. In a typical continuous process, the co-extrudate, after leaving the extrusion die and optionally being fed over cooling or shaping rollers, is contacted with a rotating wheel having a plurality of mold members each having a forming cavity (female mold), which is perforated or vented so that vacuum may be drawn in the mold. The forming cavity preferably is selectively heated and/or cooled to control the rate of thermal crystallization in the article or regions thereof. The degree of crystallinity imparted to a particular region of the article is a function of not only the thermoforming temperature, but also the identity and properties of the thermoplastic material, e.g., intrinsic viscosity (I.V.) and the like, and its thickness in the region.

The time that the co-extrudate remains in contact with the mold surface at the molding temperature can vary over a wide range and depends on a number of factors, such as the molding temperature, the dimensions of the mold, the number of molds, and the like. Preferably, the co-extrudate remains in the mold for a time sufficient to heat-set the article. The time at the molding temperature most often ranges from about 10–30 seconds, more usually from about 10–20 seconds.

A significant advantage of a continuous process over a discontinuous process is that the individual layers can be extruded and molded at different temperatures in accordance with their individual thermoforming properties, such as softening and melting points. The first layer (polyester) typically is extruded at a temperature of from about 450 to 530° F. (about 232 to 276° C.). The intermediate or tie layer most often is extruded at a higher temperature to improve its adhesion properties, typically from about 480 to 550° F. (about 249 to 288° C.). The third, polyethylene layer typically is extruded at a temperature of from about 425 to about 550° F. (about 218 to 288° C.).

By extruding each of the layers at their individual most suitable thermoforming temperatures, surface contact between the layers is dramatically improved and the likelihood of delamination is reduced or avoided. In addition, the vacuum in the mold often is sufficient to obtain adequate contact between the layers for adhesion, without the need for a pressure box. It is desirable to avoid the use of a pressure box not only because of increased process time and expense, but also because of the problem of unwanted adhesion between the pressure box and the upper (e.g., polyethylene) layer.

Preferably, the layers are co-extruded with the (thicker) first layer on top, and a reversing roll is used to invert the co-extrudate prior to being contacted with the molding surface. When female molds are used, the first layer typically contacts the mold surface.

In a typical discontinuous or semi-continuous process, the layers are co-extruded as described above and wound into rolls for storage (discontinuous) or are directly fed into a thermoformer (semi-continuous), often using pressure-assisted matched molds. An example of a discontinuous process that can be used is described in Gartland U.S. Pat. No. 4,469,270, the disclosure of which is hereby incorporated by reference. A significant difference between a continuous process and a discontinuous or semi-continuous process is that in the latter, the sheet is heated to the thermoforming temperature while in the mold, rather than using residual heat from the extruder as in a continuous process. As a result, it is difficult to control the molding temperature of the individual layers because they are re-heated after being laminated.

While particular embodiments of the present invention have been described and illustrated, it should be understood that the invention is not limited thereto since modifications may be made by persons skilled in the art The present application contemplates any and all modifications that fall within the spirit and scope of the underlying invention disclosed and claimed herein.

What is claimed is:

1. A multi-layered thermoformed food tray comprising first, second, and third layers heat-set into a rigid, dimensionally stable article having a bottom portion and a flange portion, wherein the first, second, and third layers comprise:

a first polymeric layer comprising a polymer selected from the group consisting of PET, PEN, PETG, PCT, PCTA, PTT, and mixtures thereof;

a second intermediate layer comprising a grafted or backbone co-polymer or ter-polymer of ethylene, a glycidyl acrylate, and optionally an acrylate selected from the group consisting of methacrylate, ethylacrylate, propylacrylate, butylacrylate, ethylhexylacrylate, and mixtures thereof; and a third polymeric layer comprising high density polyethylene, low density polyethylene, linear low density polyethylene, or a blend thereof;

wherein the first layer comprises a blend of (i) virgin polymer and (ii) reprocessed polymeric materials from the first, second, and third layers.

2. The food tray of claim 1 wherein said first polymeric layer comprises one or more optionally branched homo-polymers, co-polymers, reprocessed polymers, recycled polymers, or a mixture thereof.

3. The food tray of claim 1 wherein said second intermediate layer is selected from the group consisting of ethylene/glycidyl methacrylate co-polymer, ethylene/glycidyl methacrylate/methacrylate ter-polymer, ethylene/glycidyl methacrylate/ethylacrylate ter-polymer, ethylene/glycidyl methacrylate/butylacrylate ter-polymer, ethylene/glycidyl methacrylate/ethylhexylacrylate ter-polymer, and mixtures thereof.

4. The food tray of claim 3 wherein said second intermediate layer comprises a grafted co-polymer or ter-polymer.

5. The food tray of claim 3 wherein said second intermediate layer comprises a blend of (i) said co-polymer or ter-polymer and (ii) a co-polymer of ethylene and an acrylate.

6. The food tray of claim 1 wherein said first polymeric layer is dimensionally distorted when the food tray is filled with food and is exposed to microwave radiation.

7. The food tray of claim 1, wherein said first polymeric layer is heat set and wherein said food tray is suitable for cooking in a microwave oven.

8. The food tray of claim 1, wherein said food tray contains foodstuff and is sealed with highly elastic polyethylene-based lidding stock using modified atmosphere packaging.

9. A multi-layered thermoformed microwavable food tray comprising first, second, and third layers heat-set into a rigid article which is dimensionally stable at elevated temperatures encountered in cooking applications, the article having a bottom portion and a flange portion, wherein the first, second, and third layers comprise:

a first polymeric layer comprising polyethylene terephthalate;

a second intermediate layer selected from the group consisting of ethylene/glycidyl methacrylate co-polymer, ethylene/maleic anhydride co-polymer, ethylene/glycidyl methacrylate/methacrylate ter-polymer, ethylene/glycidyl methacrylate/ethylacrylate ter-polymer, ethylene/glycidyl methacrylate/butylacrylate ter-polymer, ethylene/glycidyl methacrylate/ethylhexylacrylate ter-polymer, ethylene/maleic anhydride/methacrylate ter-polymer, ethylene/maleic anhydride/ethylacrylate ter-polymer, ethylene/maleic anhydride/butylacrylate ter-polymer, ethylene/maleic anhydride/ethylhexylacrylate ter-polymer, and mixtures thereof; and a third polymeric layer comprising high density polyethylene, low density polyethylene, linear low density polyethylene, or a blend thereof;

wherein the first layer comprises a blend of (i) virgin polymer and (ii) reprocessed polymeric materials from the first, second, and third layers.

10. The multi-layered thermoformed microwavable food tray of claim 9 wherein:

said first polmeric layer has an average thickness of from about 5 to about 35 mils;

wherein said second intermediate layer has an average thickness of from about 0.1 to about 2 mils;

wherein said third polmeric layer has an average thickness of from about 1 to about 5 mils; and wherein said container has an area stretch ratio of from about 1.5:1 to about 3:1.

* * * * *